United States Patent
Hsieh et al.

(10) Patent No.: US 9,705,987 B2
(45) Date of Patent: Jul. 11, 2017

(54) SERVER CONTROL METHOD AND CHASSIS CONTROLLER

(71) Applicant: Wistron Corporation, New Taipei (TW)

(72) Inventors: Cheng-Kuang Hsieh, New Taipei (TW); Chih-Hung Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 219 days.

(21) Appl. No.: 14/543,908

(22) Filed: Nov. 18, 2014

(65) Prior Publication Data

US 2016/0072887 A1 Mar. 10, 2016

(30) Foreign Application Priority Data

Sep. 10, 2014 (TW) .............................. 103131194 A

(51) Int. Cl.
*G06F 15/16* (2006.01)
*H04L 29/08* (2006.01)

(52) U.S. Cl.
CPC .......... *H04L 67/1097* (2013.01); *H04L 67/06* (2013.01)

(58) Field of Classification Search
CPC ........................ H04L 67/06; H04L 67/1097
USPC ......................................... 709/208, 209, 211
See application file for complete search history.

(56) References Cited

U.S. PATENT DOCUMENTS

| | | | |
|---|---|---|---|
| 6,715,098 B2 | 3/2004 | Chen et al. | |
| 7,068,500 B1 * | 6/2006 | Beinor, Jr. | G06F 1/182 174/254 |
| 7,594,024 B2 * | 9/2009 | Shah | G06F 3/0605 370/351 |
| 2004/0081186 A1 * | 4/2004 | Warren | H04L 12/433 370/419 |
| 2004/0081187 A1 * | 4/2004 | Warren | H04L 12/4637 370/419 |
| 2004/0085972 A1 * | 5/2004 | Warren | H04L 12/433 370/401 |
| 2004/0085974 A1 * | 5/2004 | Mies | H04L 12/42 370/406 |
| 2004/0085994 A1 * | 5/2004 | Warren | H04L 12/433 370/462 |
| 2008/0040463 A1 * | 2/2008 | Brown | H04L 41/12 709/223 |
| 2009/0216910 A1 * | 8/2009 | Duchesneau | G06F 9/5072 709/250 |

\* cited by examiner

*Primary Examiner* — Davoud Zand
(74) *Attorney, Agent, or Firm* — Jianq Chyun IP Office

(57) ABSTRACT

A server control method and a chassis controller are proposed. The server control method includes: determining whether the chassis controller is connected to a blade server when a power of the chassis controller is on; when the chassis controller is connected to the blade serve, further determining whether the blade server operates normally; when the blade server operates normally, switching the chassis controller to a slave device of the blade server, and controlling a just a bunch of disk (JBOD) system in response to a control command of the blade server.

9 Claims, 3 Drawing Sheets

SERVER CONTROL METHOD AND CHASSIS CONTROLLER

CROSS-REFERENCE TO RELATED APPLICATION

This application claims the priority benefit of Taiwan application serial no. 103131194, filed on Sep. 10, 2014. The entirety of the above-mentioned patent application is hereby incorporated by reference herein and made a part of this specification.

BACKGROUND

Field of the Invention

The invention is directed a control method and a controller and more particularly, to a server control method and a chassis controller.

Description of Related Art

Along with development of cloud networking technologies, more and more providers provide data centers including various types of servers to provide users with corresponding data storage services. In the conventional information technology (IT), a just a bunch of disks (JBOD) system and a storage server are two different kinds of products. The JBOD system typically has a storage function only, while the storage server additionally has a computing function. The two kinds of products are required to have characteristics, such as high availability (HA) and redundancy, and thus, two motherboards are needed to meet the requirements.

Nevertheless, in a Hadoop architecture adopted as the main stream of the data centers, the HA and data backup mechanisms are mostly achieved by superior-leveled management software, and as a result, the HA and the redundancy capabilities of the chassis of the conventional JBOD storage server itself seem superfluous. These superfluous capabilities cause increases in not only costs of construction of the data centers (because motherboards related to input/output have to be prepared in duplicate), but also in power consumption, which does not meet the current trend of green energy.

SUMMARY

Accordingly, the invention proposes a server control method and a chassis controller, capable of adaptively switching to a just a bunch of disks (JBOD) system or a storage server, so as to effectively reduce cost and power consumption and improve operational flexibility for users.

The invention is directed to a server control method suitable for controlling a chassis controller of a JBOD system. The server control method includes: when a power of the chassis controller is on, determining whether the chassis controller is connected to a blade server; when the chassis controller is connected to the blade server, further determining whether the blade server operates normally; and when the blade server operates normally, switching the chassis controller to a slave device of the blade server, and controlling the JBOD system in response to a control command of the blade server.

In an embodiment of the invention, when the chassis controller is not connected to the blade server, the blade server does not operate normally or the chassis controller is not successfully switched to the slave device of the blade server, the method further includes: switching the chassis controller to a master mode for controlling the JBOD system.

In an embodiment of the invention, after the step of switching the chassis controller to the master mode for controlling the JBOD system, the method further includes: activating at least one hard disk drawer in the JBOD system; initiating the at least one hard disk drawer; and accessing information in the at least one hard disk drawer.

In an embodiment of the invention, the step of controlling the JBOD system in response to the control command of the blade server includes: determining whether the control command is a standby command; and when the control command is the standby command, switching the JBOD system to an offline mode in response to the standby command.

In an embodiment of the invention, when the control command is not the standby command, the method further includes: activating at least one hard disk drawer; initiating the at least one hard disk drawer; and accessing information in the at least one hard disk drawer.

The invention is directed to a chassis controller configured to control a JBOD system. The chassis controller includes a storage unit and a processing unit. The storage unit stores a plurality of modules. The processing unit is coupled to the storage unit, accesses and executes the modules. The modules include a first determining module, a second determining module and a first switching module. When a power of the chassis controller is on, the first determining module determines whether the chassis controller is connected to a blade server. When the chassis controller is connected to the blade server, the second determining module determines whether the blade server operates normally. When the blade server operates normally, the first switching module switches the chassis controller to a slave device of the blade server, and controls the JBOD system in response to a control command of the blade server.

In an embodiment of the invention, the modules include a second switching module. When the chassis controller is not connected to the blade server, the blade server does not operate normally or the chassis controller is not successfully switched to the slave device of the blade server, the second switching module is configured to switch the chassis controller to a master mode for controlling the JBOD system.

In an embodiment of the invention, the modules further include an activating module configured to: activate at least one hard disk drawer in the JBOD system; initiate the at least one hard disk drawer; and access information in the at least one hard disk drawer.

In an embodiment of the invention, the modules further include a third determining module. The third determining module is configured to determine whether the control command of the blade server is a standby command. When the control command is the standby command, the third determining module controls the first switching module to switch the JBOD system to an offline mode in response to the standby command.

In an embodiment of the invention, the modules further includes an activating module. When the third determining module determines that the control command of the blade server is not the standby command, in response to the standby command, the activating module is configured to: activate at least one hard disk drawer in the JBOD system; initiate the at least one hard disk drawer; and access information in the at least one hard disk drawer.

To sum up, in the method proposed according to the embodiment of the invention, the chassis controller may be adaptively switched to the slave device or the master mode in response to whether the blade server connected to the chassis controller exists, and thereby, cost and power consumption can be effectively reduced, and operational flexibility can be improved for users.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
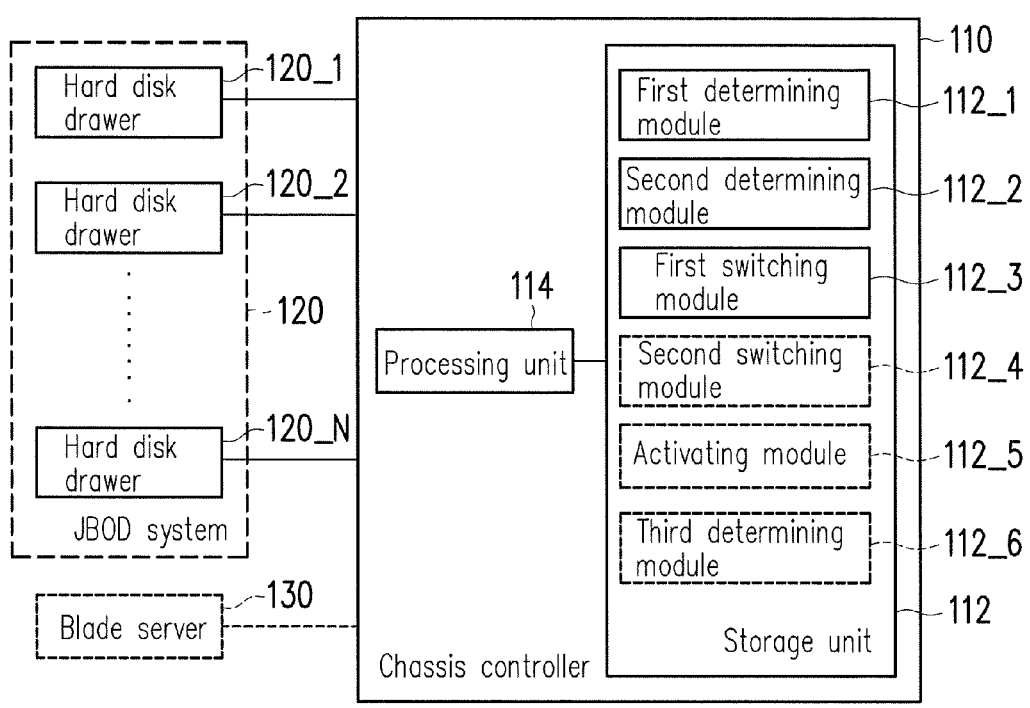
FIG. 1 is a schematic diagram illustrating a dual mode chassis according to an embodiment of the invention.

FIG. 1 is a schematic diagram illustrating a dual mode chassis according to an embodiment of the invention. In the present embodiment, a dual mode chassis 100 may include a chassis controller 110 and a JBOD system 120.

The chassis controller 110 includes a storage unit 112 and a processing unit 114. The storage unit 112 may be, for example, a memory, a hard disk or any other element applied to store data, and may be configured to record a plurality of modules. The processing unit 114 is coupled to the storage unit 112. The processing unit 114 may be a general purpose processor, a general purpose processor, a specific purpose processor, a traditional processor, a digital signal processor, a plurality of microprocessors, one or a plurality of microprocessors integrated with digital signal processing cores, a controller, a microcontroller, an application specific integrated circuit (ASIC), a field programmable gate array (FPGA), other types of integrated circuits, a state machine, an advanced RISC machine (ARM) processor, or the like.

The JBOD system 120 includes hard disk drawers 120_1 to 120_N (N is a positive integer). In an embodiment, the JBOD system 120 may be a serial attached small computer system interface (SAS)/serial advanced technology attachment (SATA) JBOD (i.e., an SAS/SATA JBOD), and each of the hard disk drawers 120_1 to 120_N may be an SAS hard disk, but the invention is not limited thereto. In an embodiment, each of the hard disk drawers 120_1 to 120_N may respectively include a corresponding SAS expander which serves to process various control signals from the chassis controller 110.

In the present embodiment, the processing unit 114 may access and execute a first determining module 112_1, a second determining module 112_2 and a first switching module 112_3 in the storage unit 112 to perform each step of a server control method proposed by the invention.

Figure 2:
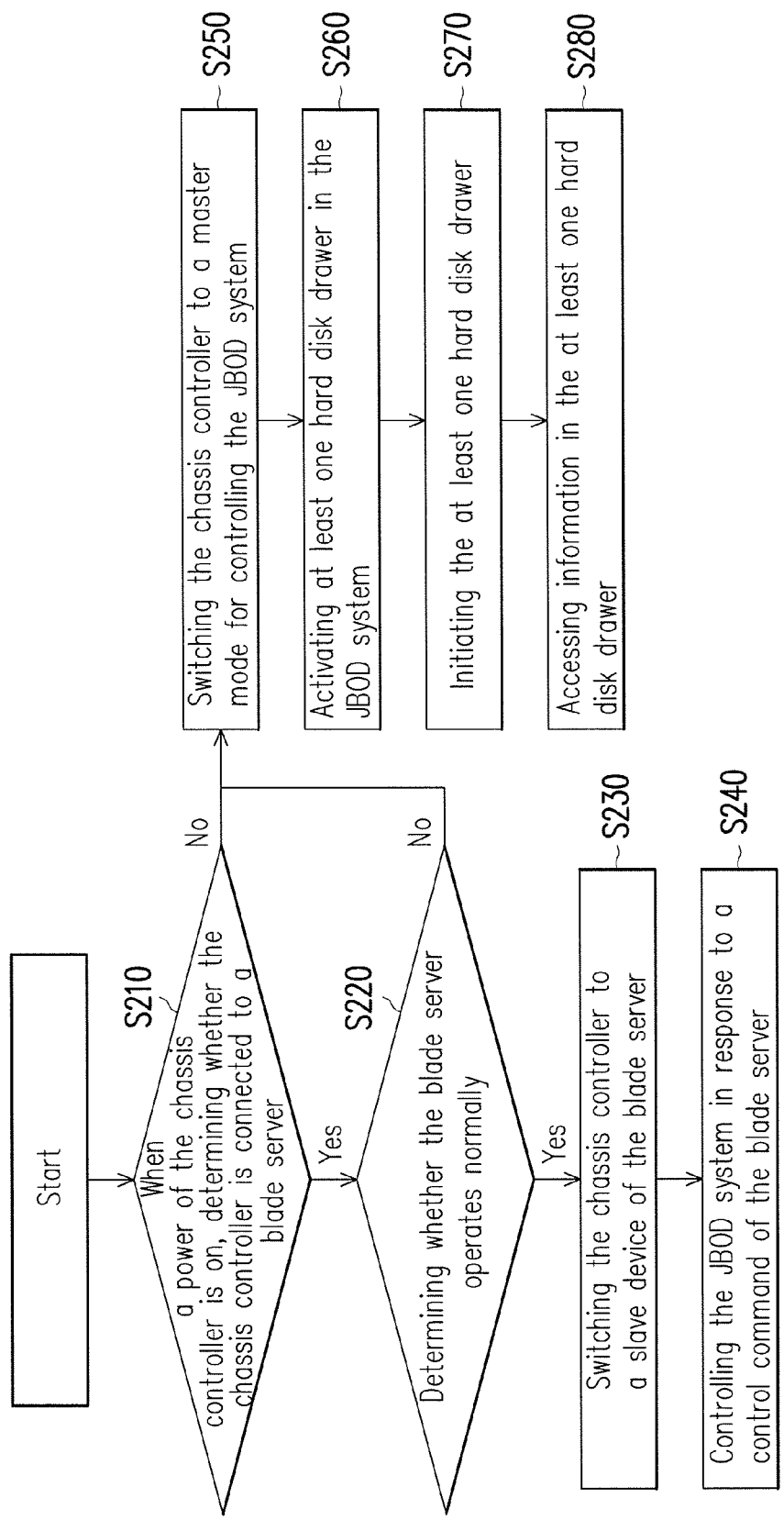
FIG. 2 is a flowchart illustrating a server control method according to an embodiment of the invention.

FIG. 2 is a flowchart illustrating a server control method according to an embodiment of the invention. The method provided in the present embodiment may be executed by the chassis controller 110 depicted in FIG. 1. The steps of the method will be described in detail with reference to each element of FIG. 1.

In step S210, when a power of the chassis controller 110 is on, the first determining module 112_1 may determine whether the chassis controller 110 is connected with a blade server 130. The blade server 130 is a server unit formed by integrating hardware dedicated to a server system, such as a processor, a memory, even a hard disk drive, to a single motherboard, and a plurality of server units share resources, such as a chassis, a power supply to reduce the requirements of installation space for the server.

When the first determining module 112_1 determines that the chassis controller 110 is connected to the blade server 130, in step S220, the second determining module 112_2 may determine whether the blade server 130 operates normally. In an embodiment, second determining module 112_2 may determine whether a handshaking command or any other control command is received from the blade server 130. If yes, the second determining module 112_2 may recognize that the blade server 130 operate normally; otherwise, the second determining module 112_2 may recognize that the blade server 130 does not operate normally, which construes no limitations to the implementable embodiments of the invention.

When the second determining module 112_2 determines that the blade server 130 operates normally, in step S230, the first switching module 112_3 may switch the chassis controller 110 to a slave device of the blade server 130. Concurrently, in step S240, the first switching module 112_3 may control the JBOD system 120 in response to a control command of the blade server 130.

In brief, the chassis controller 110 may determine whether any normally operating blade server is connected therewith when the power is on. If so, the chassis controller 110 may be switched to the slave device of the blade server and controlled by the blade server to control the JBOD system 120. Namely, when the dual mode chassis 100 includes a blade server 130 connected to the chassis controller 100, the dual mode chassis 100 may be considered as in a storage server mode and have not only a storage function provided by the JBOD system 120, but also an computing function provided by the blade server 130.

In other embodiments, the storage unit 120 may further include a second switching module 112_4 and an activating module 112_5 serving to perform corresponding operations in scenarios where the chassis controller 110 is not connected to blade server 130 or the blade server 130 does not operate normally, such that the chassis controller 110 may still actively control the JBOD system 120.

Referring again to FIG. 2, in step S210, when the chassis controller 110 is not connected to the blade server 130, or in step S220, when the blade server 130 does not operate normally, the second switching module 112_4 may switch the chassis controller 110 to a master mode for controlling the JBOD system 120 in step S250.

In other embodiments, when the first switching module 112_3 does not successfully switch the chassis controller 110 to the slave device of the blade server 130 in step S230, the second switching module 112_4 may also continue to perform step S250 to switch the chassis controller 110 to the master mode for controlling the JBOD system 120.

After the chassis controller 110 is switched to the master mode, in step S260, the activating module 112_5 may activate the hard disk drawers 120_1 to 120_N of the JBOD system 120. For instance, the activating module 112_5 may power on the hard disk drawers 120_1 to 120_N, which construes no limitations to the implementable embodiments of the invention.

Then, in step S270, the activating module 112_5 may initiate the hard disk drawers 120_1 to 120_N. If it is assumed that each of the hard disk drawers 120_1 to 120_N includes an SAS expander, the activating module 112_5 may initiate the SAS expanders in step S270, but the implementable embodiments of the invention are not limited thereto.

Thereafter, in step S280, the activating module 112_5 may access information in the hard disk drawers 120_1 to 120_N. In an embodiment, the activating module 112_5 may access the information of each of the hard disk drawers 120_1 to 120_N, such as a temperature, a vibration and an power states, through a control channel (e.g., an inter-integrated circuit (I2C) interface) between the chassis controller 110 and each of the hard disk drawers 120_1 to 120_N. Thereby, the activating module 112_5 may store information in the storage unit 112 of the chassis controller 110. In this way, when the chassis controller 110 is afterwards switched to the slave device of the blade server 130, the blade server 130 may obtain the aforementioned information through the control channel.

In other words, when the chassis controller 110 is not connected to the blade server 130, the blade server 130 does not operate normally, or the chassis controller 110 is not successfully switched to the slave device of the blade server 130, the chassis controller 110 may be switched to the master mode to actively control the JBOD system 120. In such scenario, the dual mode chassis 100 may be considered simply as a JBOD system mode with the storage function provided by the JBOD system 120.

In brief, in the method provided by the embodiment of the invention, the chassis controller 110 may be adaptively switched to the slave device or the master mode depending on whether the dual mode chassis 100 includes the blade server (which operates normally). That is, when the dual mode chassis 100 includes the blade server, the dual mode chassis 100 may be considered as in the storage server mode. On the other hand, when the dual mode chassis 100 does not include the blade server, the dual mode chassis 100 may be considered as in the JBOD system mode. In this way, the two modes may be achieved by configuring only one motherboard in the dual mode chassis 100, such that power consumption and implementation cost can be reduced.

In another perspective, no matter what configuration the blade server 130 has, the chassis controller 110 may control the JBOD system 120 in the role of slave device of the blade server 130. Thus, when a user wants to update the dual mode chassis 100, the user only needs to upgrades the blade server 130 to a newer version, or use a blade server with more advanced technology. In this way, convenience for the user to maintain dual mode chassis 100 can be effectively improved, so as to enhance operational flexibility thereof.

In other embodiments, after the chassis controller 110 is switched to the slave device of the blade server 130, the chassis controller 110 may control the JBOD system 120 to enter an offline mode in response to a control command from the blade server 130, or control the activating module 112_5 to perform an operation corresponding to the control command.

Figure 3:
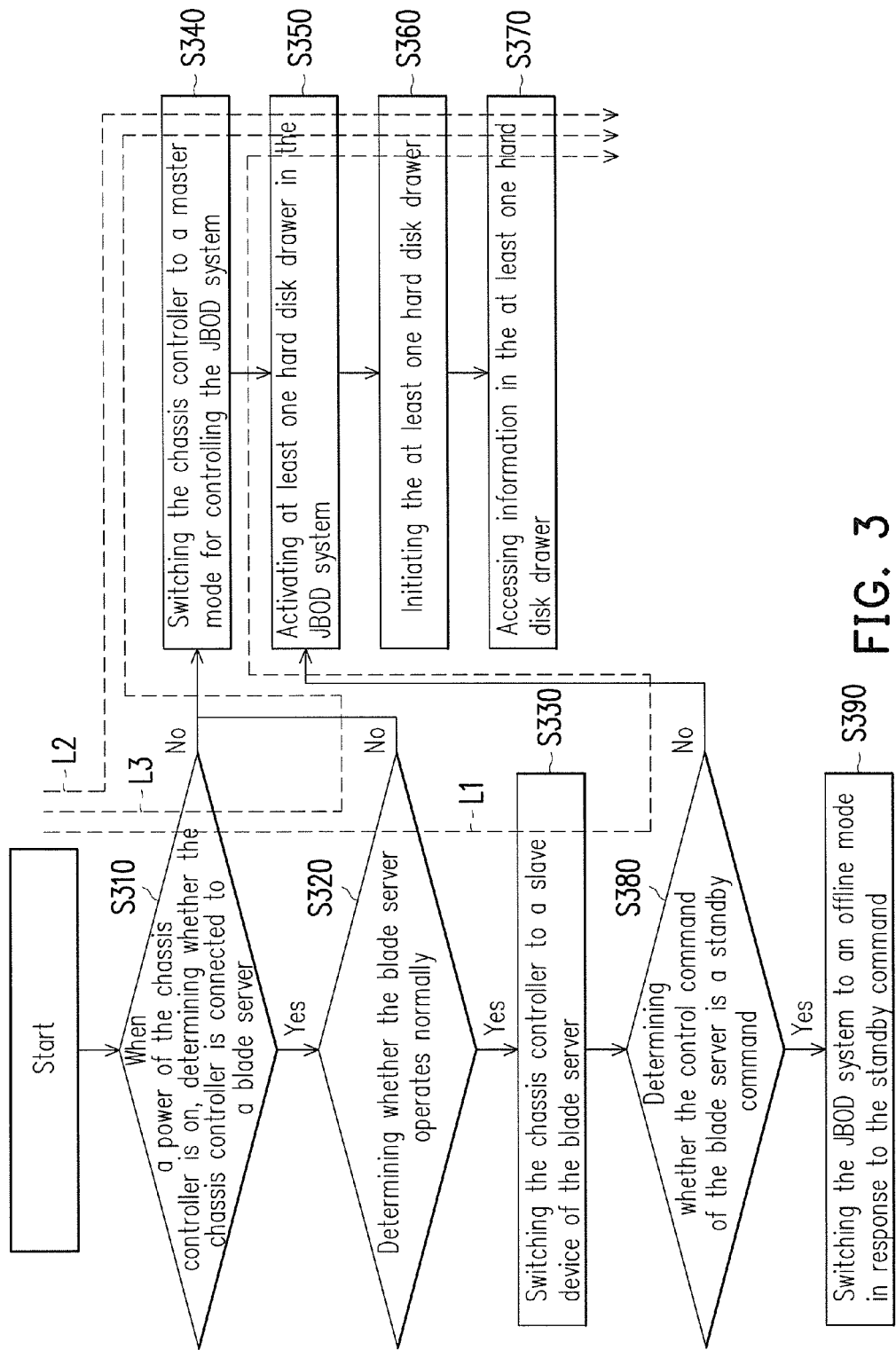
FIG. 3 is a flowchart illustrating a server control method according to another embodiment based on the embodiment depicted in FIG. 2.

Referring to FIG. 3, FIG. 3 is a flowchart illustrating a server control method according to another embodiment based on the embodiment depicted in FIG. 2. The method provided in the present embodiment may be executed by the chassis controller 110 depicted in FIG. 1. The steps of the method will be described in detail with reference to each element of FIG. 1.

In step S310, when a power of the chassis controller 110 is on, the first determining module 112_1 may determine whether the chassis controller 110 is connected with the blade server 130. In step S320, the second determining module 112_2 may determine whether the blade server 130 operates normally. In step S330, the first switching module 112_3 may switch the chassis controller 110 to a slave device of the blade server 130. In step S340, the second switching module 112_4 may switch the chassis controller 110 to the master mode for controlling the JBOD system 120. In step S350, the activating module 112_5 may activate the hard disk drawers 120_1 to 120_N in the JBOD system 120. In step S360, the activating module 112_5 may initiate the hard disk drawers 120_1 to 120_N. In step S370, the activating module 112_5 may access the information in the hard disk drawers 120_1 to 120_N. Details with respect to steps S310 through S370 may refer to the description related to steps S210 through S230 and S250 through S280 in FIG. 2 and thus, will no longer be repeated hereinafter.

It should be noted that the chassis controller 110 may further include a third determining module 112_6 to determine whether the control command of the blade server 130 is a standby command in step S380. If yes, the third determining module 112_6 may control the first switching module 112_3 to switch the JBOD system 120 to the offline mode in response to the standby command in step S390, to achieve power saving.

On the other hand, when the control command is not the standby command, the activating module 112_5 may also perform steps S350 through S370.

For descriptive convenience, the sequentially performed steps S310 through S330, S380 and S350 through S370 are referred to as process L1, the sequentially performed steps S310 and S340 through S37 are referred to as process L2, and the sequentially performed steps S310 through S320 and S340 through S370 are referred to as process L3.

It should be understood that all processes L1, L2 and L3 contain steps S350 through S370. However, the spirit of process L1 lies in the activating module 112_5 performing steps S350 through S370 in response to the control command of the blade server 130, while in processes L2 and L3, the chassis controller 110 controls the JBOD system 120 by means of the master mode, instead of controlling the JBOD system 120 in the role of the slave device of the blade server 130.

To conclude, in the method provided according to the embodiments of the invention, the storage server mode or the JBOD system mode is switched to depending on whether the dual mode chassis includes the (normally operating) blade server. Thereby, the power consumption and the implementation cost can be reduced, as well as the convenience and the operational flexibility for the user in maintaining the dual mode chassis can be improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A server control method, suitable for controlling a chassis controller of a just a bunch of disk (JBOD) system, comprising:

when a power of the chassis controller is on, determining whether the chassis controller is connected to a blade server;

when the chassis controller is connected to the blade server, further determining whether the blade server operates normally by determining whether a handshaking command or a control command is received from the blade server;

when the blade server operates normally, switching the chassis controller to a slave device of the blade server, and controlling the JBOD system in response to a control command of the blade server; and when the chassis controller is not connected to the blade server, when the blade server does not operate normally or when the chassis controller is not successfully switched to the slave device of the blade server, switching the chassis controller to a master mode for controlling the JBOD system.

2. The server control method according to claim 1, wherein after the step of switching the chassis controller to the master mode for controlling the JBOD system, the method further comprises:

activating at least one hard disk drawer in the JBOD system;

initiating the at least one hard disk drawer; and accessing information in the at least one hard disk drawer.

3. The server control method according to claim 1, wherein the step of controlling the JBOD system in response to the control command of the blade server comprises:

determining whether the control command is a standby command; and when the control command is the standby command, switching the JBOD system to an offline mode in response to the standby command.

4. The server control method according to claim 3, wherein when the control command is not the standby command, the method further comprises:

activating at least one hard disk drawer;

initiating the at least one hard disk drawer; and accessing information in the at least one hard disk drawer.

5. A chassis controller, configured to control a just a bunch of disk (JBOD) system, comprising:

a storage unit, storing a plurality of modules; and a processing unit, coupled to the storage unit, accessing and executing the modules, wherein the modules comprise:

a first determining module, when a power of the chassis controller is on, determining whether the chassis controller is connected to a blade server;

a second determining module, when the chassis controller is connected to the blade server, determining whether the blade server operates normally by determining whether a handshaking command or a control command is received from the blade server; and a first switching module, when the blade server operates normally, switching the chassis controller to a slave device of the blade server, and controlling the JBOD system in response to a control command of the blade server, wherein when the chassis controller is not connected to the blade server, the blade server does not operate normally or the chassis controller is not successfully switched to the slave device of the blade server, the second switching module is configured to switch the chassis controller to a master mode for controlling the JBOD system.

6. The chassis controller according to claim 5, wherein the modules further comprise an activating module configured to:

activate at least one hard disk drawer in the JBOD system;

initiate the at least one hard disk drawer; and access information in the at least one hard disk drawer.

7. The chassis controller according to claim 5, wherein the modules further comprise:

a third determining module, configured to determine whether the control command of the blade server is a standby command, wherein when the control command is the standby command, the third determining module controls the first switching module to switch the JBOD system to an offline mode in response to the standby command.

8. The chassis controller according to claim 7, wherein the modules further comprises an activating module, wherein when the third determining module determines that the control command of the blade server is not the standby command, in response to the standby command, the activating module is configured to:

activate at least one hard disk drawer in the JBOD system;

initiate the at least one hard disk drawer; and access information in the at least one hard disk drawer.

9. A chassis, comprising:

a just a bunch of disks (JBOD) system; and a chassis controller, connected to the JBOD system, and determining whether a blade server is connected, switching into a master mode when the blade server is not connected to the chassis controller, switching into a slave device with respect to the blade server when the blade server is connected to the chassis controller, wherein when the chassis controller is in the master mode, the JBOD system is controlled by the chassis controller, and wherein when the chassis controller is in the slave mode, the JBOD system is controlled in response to a control command of the blade server.

* * * * *